Figure 1:
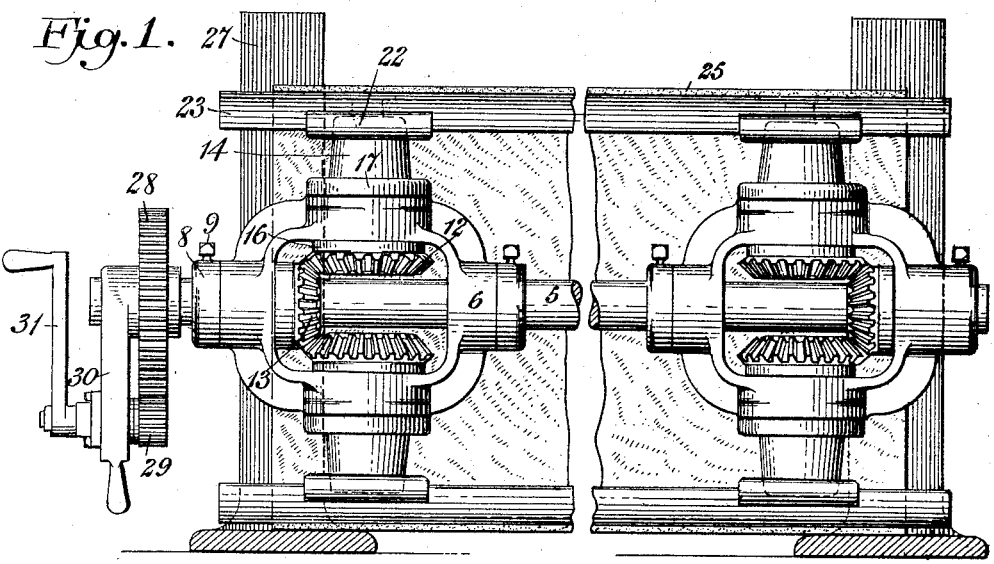

S. W. DODGE.
STRETCHER.
APPLICATION FILED JAN. 21, 1914.

1,112,274.

Patented Sept. 29, 1914.
2 SHEETS—SHEET 1.

WITNESSES

INVENTOR
Samuel W. Dodge
BY
ATTORNEYS

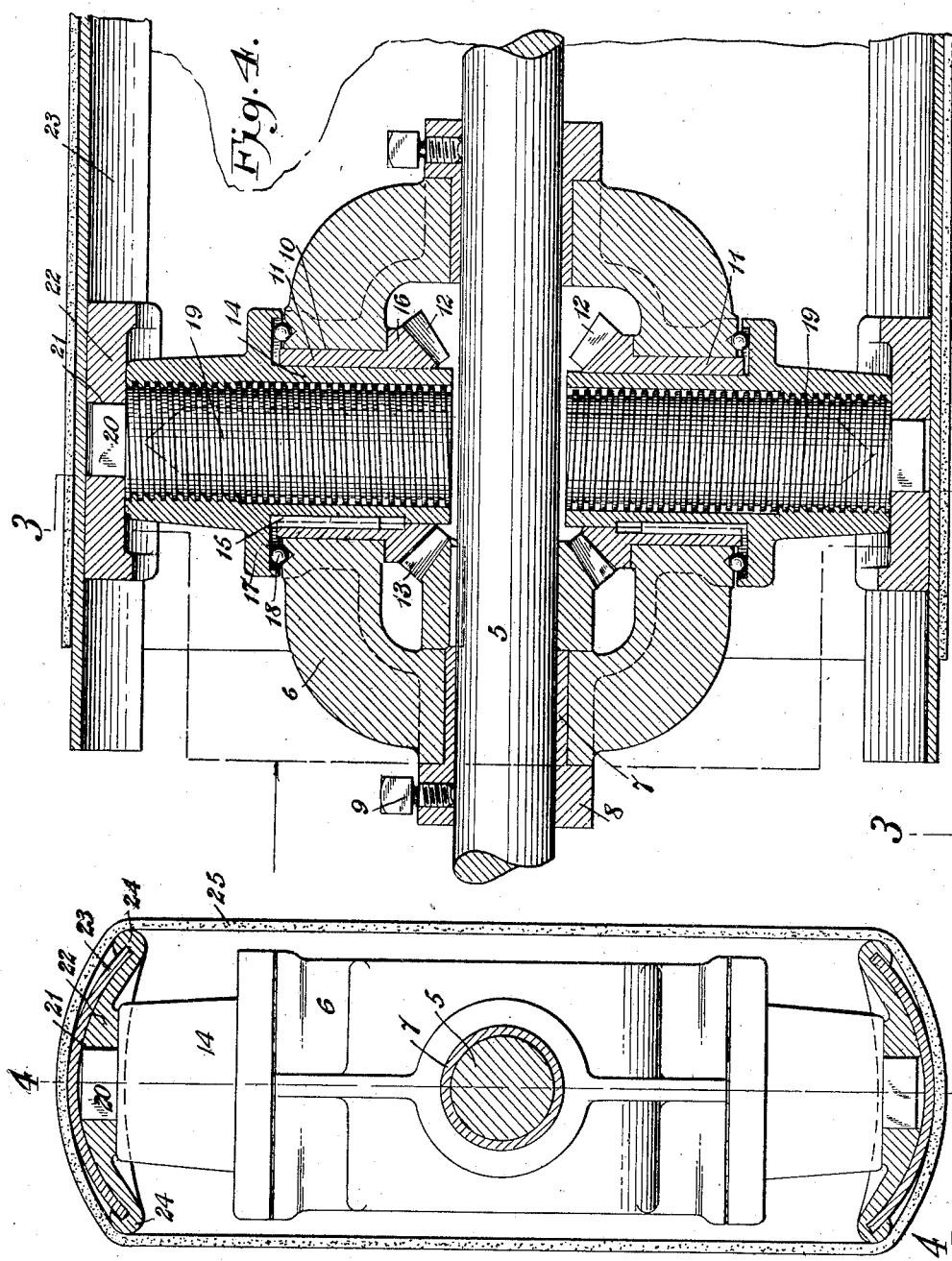

UNITED STATES PATENT OFFICE.

SAMUEL WORCESTER DODGE, OF FITCHBURG, MASSACHUSETTS.

STRETCHER.

1,112,274. Specification of Letters Patent. Patented Sept. 29, 1914.

Application filed January 21, 1914. Serial No. 813,542.

*To all whom it may concern:*

Be it known that I, SAMUEL W. DODGE, a citizen of the United States, and a resident of Fitchburg, in the county of Worcester and State of Massachusetts, have invented a new and Improved Stretcher, of which the following is a full, clear, and exact description.

My invention has for its object to provide a stretcher which may be used for stretching various flexible materials such as felt. The stretcher is constructed with an operating shaft on which are mounted any desired number of means for moving away from the shaft, heads which carry the stretching irons. My stretcher is preferably supported in a stand for preventing its rotation with its shaft, the shaft being disposed horizontally for rotation by a crank and gearing. The stretcher is especially well adapted for stretching jackets for couch rolls used in paper-making machinery.

Additional objects of the invention will appear in the following specification in which the preferred form of my invention is disclosed.

Figure 2:
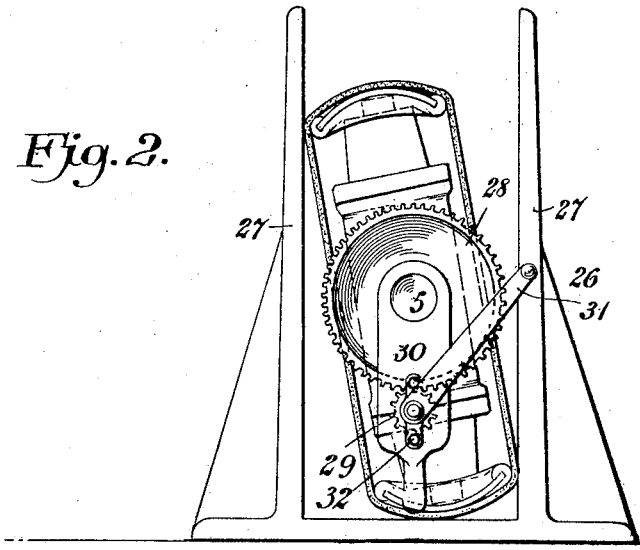

In the drawings similar reference characters refer to similar parts in all the views in which;

Figure 1 is a side elevation of the stretcher showing the stand in section; Fig. 2 is an end view of Fig. 1; Fig. 3 is a sectional view on the line 3—3 of Fig. 4; and Fig. 4 is a sectional view on the line 4—4 of Fig. 3.

By referring to the drawings it will be seen that on the operating shaft 5 two or more frames 6 are mounted, the frames 6 being separated from the shaft 5 by the bushings 7 which are integral with the collars 8 which engage the ends of the frames 6, and which are held in place by the set screw 9. Each of the frames 6 has two bearings 10 in which are disposed sleeves 11 on bevel gears 12, the bevel gears 12 meshing with a bevel gear 13, keyed to the shaft 5. Disposed in each of the sleeves 11, there is a nut 14, each of the nuts 14 being keyed to rotate with its sleeve 11, the key being shown at 15. It will, therefore, be seen that with the rotation of the shaft 5 the sleeve 11 of the nut 14, will rotate on an axis at right angles to the axes of the shaft 5. The bevel gears 12 have shoulders 16 which bear against the inner sides of the frames 6 and the nuts 14 have outwardly extending flanges 17 which bear against the outer side of the said frames 6. As shown in the drawings I prefer to provide a ballbearing 18 for separating the flanges 17 from the frames 6. Each of the frames 6 has two bearings openings 10 which are disposed at opposite sides of the shaft 5, and in each of these bearing openings, a nut 14 is mounted for rotating by means of the sleeve 11 and the bevel gear 12 which meshes with the bevel gear 13. It will be understood that the shoulders 16 will prevent the bevel gear 12 from moving out of mesh with the bevel gear 13, the outer flanges 17 on each of the nuts 14, serving to prevent the inward movement of the nuts 14 relatively to the shaft 5. Disposed in the nuts 14 and meshing with the threads thereof, there are threaded members 19 which have projecting ends 20 disposed in the openings 21 in the heads 22 which are provided for supporting the stretching irons 23. As will be seen by referring to Fig. 3 of the drawings, the heads 22 are disposed transversely with their ends 24 bent upwardly and inwardly around the sides of the stretching irons 23. Each of the stretching irons will be engaged by two or more of the supporting heads 22, and it will be seen that when the supporting heads are prevented from rotating, the shaft 5 may be rotated by the means described, which will force the threaded members 19 outwardly, carrying with them the heads 22 to move the stretching irons 23 away from each other, which will stretch any material 25 which may be disposed around the stretching irons. The stretching irons are prevented from rotating by the stand 26 which has uprights 27 between which the stretching irons are disposed. It will be seen that I prefer to dispose the stretching irons between the uprights 27 of the stand 26 with one of the stretching irons below the other. At one end of the shaft 5 there is secured a gear wheel 28 with which meshes a gear wheel 29 mounted for rotating on a yoke 30 which is freely mounted on the shaft 5. The gear wheel or pinion 29 is rotated by the crank 31. An adjustable pinion bracket 32 may be employed by which means a pinion with any desired size, may be mounted on the yoke 30 for meshing with the gear wheel 28. It will be understood that with the rotation of the crank 31, the shaft 5 will be rotated for moving the stretching irons to or from the shaft 5 as may be desired.

Having thus described my invention I claim as new and desire to secure by Letters Patent:

1. In a stretcher, a shaft, a frame mounted on the shaft and having an opening, a gear for rotating with the shaft, a gear meshing with the first gear, the second gear abutting against the frame and having a sleeve disposed in the opening in the frame, a nut disposed in the sleeve and keyed for rotating therewith, an outer flange on the nut bearing against the outer side of the frame, a threaded member meshing with the thread in the nut and a transverse supporting head mounted on the threaded member.

2. In a stretcher, a shaft, a frame disposed around the shaft and having openings at opposite sides of the shaft, a gear for rotating with the shaft, two detachable gears meshing with the first gear and abutting against the inner sides of the frame around the openings in the frame, sleeves on the second mentioned gears disposed in the openings in the frame, nuts disposed in the sleeves and keyed for rotating therewith, outer flanges on the nuts against the outer sides of the frame, and threaded members within the nuts and meshing therewith.

3. In a stretcher, a shaft, a frame having two openings spaced apart in which the shaft is rotatably disposed, collars on the shaft and engaging the frame for holding the frame against movement longitudinally of the shaft, there being another opening in the frame at an angle to the axle of the shaft, a sleeve journaled in the last mentioned opening and having a gear with a shoulder engaging the inner side of the frame at the third opening therein, a nut disposed in and keyed to the sleeve and having a flange normally engaging the outer side of the frame at the third mentioned opening therein, a threaded member meshing with the nut, and a gear keyed to the shaft with which the first mentioned gear meshes.

In testimony whereof I have signed my name to this specification in the presence of two subscribing witnesses.

SAMUEL WORCESTER DODGE.

Witnesses:
DANIEL W. MCDONALD,
JOSEPH A. DE LUDE.

Copies of this patent may be obtained for five cents each, by addressing the "Commissioner of Patents, Washington, D. C."